(12) United States Patent
Nagel

(10) Patent No.: US 6,557,592 B2
(45) Date of Patent: May 6, 2003

(54) BOTTLE VALVE

(75) Inventor: Steven J. Nagel, St. Louis, MO (US)

(73) Assignee: Intoximeters, Inc., St. Louis, MO (US)

( * ) Notice: Subject to any disclaimer, the term of this patent is extended or adjusted under 35 U.S.C. 154(b) by 0 days.

(21) Appl. No.: 09/837,777

(22) Filed: Apr. 18, 2001

(65) Prior Publication Data

US 2002/0153057 A1 Oct. 24, 2002

(51) Int. Cl.$^7$ ............................................... B65B 31/00
(52) U.S. Cl. ............................. 141/51; 141/18; 141/20; 141/21; 141/39; 141/100; 141/197; 251/149.6; 236/48 R
(58) Field of Search ............................. 141/18, 20, 21, 141/25, 27, 39, 51, 83, 100, 192, 197, 319, 346, 351, 383; 137/454.2; 251/149.6; 236/48 R, 93 R; 62/45.1

(56) References Cited

U.S. PATENT DOCUMENTS 4,513,881 A * 4/1985 Heimovics, Jr. ............ 137/468
4,821,954 A * 4/1989 Bowder ...................... 236/48 R

FOREIGN PATENT DOCUMENTS

IT              0740095 A1 * 10/1996 ........... F16K/17/38

* cited by examiner

Primary Examiner—Timothy L. Maust
(74) Attorney, Agent, or Firm—Polster, Lieder, Woodruff & Lucchesi, L.C.

(57) ABSTRACT

A bottle charged with a gaseous material intended to be discharged through a range of temperatures but not outside that range, has a valve through which the gaseous material is to be directed. The valve has at least a part wholly inside the bottle, which part has a restricted port through it through which the gaseous material passes to issue from the valve, and a thermally responsive member adapted to block the port when the temperature of the interior of the bottle is outside the range. Preferably, the gaseous material is both introduced to the bottle and discharged from the bottle through the same valve, and the valve has a fill port of larger diameter than the restricted port, and an axially moveable actuating element, and the thermally responsive member is carried by the actuating element.

10 Claims, 3 Drawing Sheets

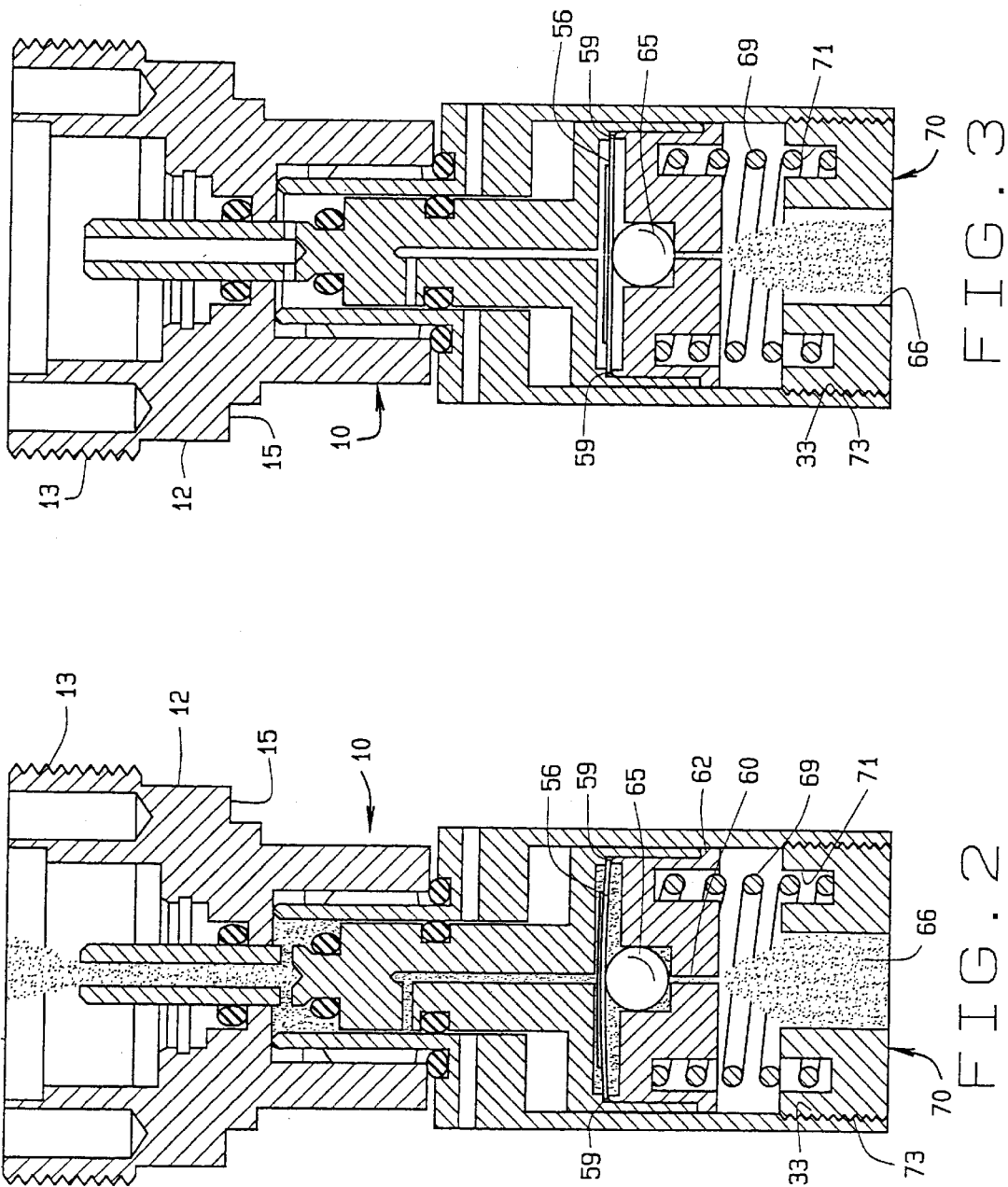

BOTTLE VALVE

CROSS REFERENCE TO RELATED APPLICATIONS

STATEMENT REGARDING FEDERALLY SPONSORED RESEARCH OR DEVELOPMENT

Not Applicable.

BACKGROUND OF THE INVENTION

The valved bottle of this invention is described as being filled with a mixture of nitrogen as a carrier gas and ethanol, the mixture being used to standardize or calibrate a breath alcohol testing device, but its utility is not confined thereto. In calibrating breath alcohol determining devices, it is essential that a calibrating gas be uniform and of exactly known alcohol content. The temperature of the ambient air around the cylinder is not a certain measure of the condition of the gaseous mixture within the bottle. It is an object of this invention to provide a valve with means for cutting off the discharge of such gaseous material when the temperature inside the bottle is outside a desired range. For example, when the gaseous material is a common nitrogen/ethanol mixture, the valve is disabled at a temperature of about 35° F. (1.7° C.), or in any event, a temperature above the dew point of the mixture. As another example, when the gaseous material is oxygen being administered to a patient, it may be desirable to maintain the temperature of the oxygen within a fairly narrow range, which can be accomplished with a valve of this invention. Another source of possible heterogeneity when the gaseous material is a mixture, is in the filling process. In valves through which a mixture of gas and volatile liquid is both introduced to a bottle or tank and discharged from the bottle or tank, conventionally, the passages through which the gas mixture flows in filling and discharging are the same. When the whole or a part of these passages is restricted, and the pressure drop over the restricted passage during the filling process is great, the expansion of the gas as it leaves the restricted passage can so cool the mixture as to cause the volatile liquid to drop out of the mixture (outgas). In addition, the restriction drastically slows the filling process. Accordingly, it is a further object of this invention to provide a valve that permits faster filling and minimizes the danger of precipitating a volatile liquid component from a gaseous mixture during the filling process.

BRIEF SUMMARY OF THE INVENTION

In accordance with this invention, generally stated, a bottle charged with a gaseous material intended to be discharged through a range of temperatures but not outside that range, is equipped with a valve through which the gaseous material is to be directed. The valve has a part wholly inside the bottle, the part having a restricted port through it through which the gaseous material passes to issue from the valve, and a thermally responsive member adapted to block the port when the temperature of the gaseous material is outside the predetermined range. The valve also has a fill port of greater diameter than the restricted discharge port, which permits faster filling with less danger of precipitating volatile liquids from a volatile liquid/gas mixture.

BRIEF DESCRIPTION OF THE SEVERAL VIEWS OF THE DRAWINGS

In the drawings:

FIG. 2 is sectional view of the valve of FIG. 1 in gaseous content discharge condition;

FIG. 3 is sectional view of the valve of FIG. 1 in gaseous content discharge blocked condition.

DETAILED DESCRIPTION OF THE PREFERRED EMBODIMENT

Figure 1:
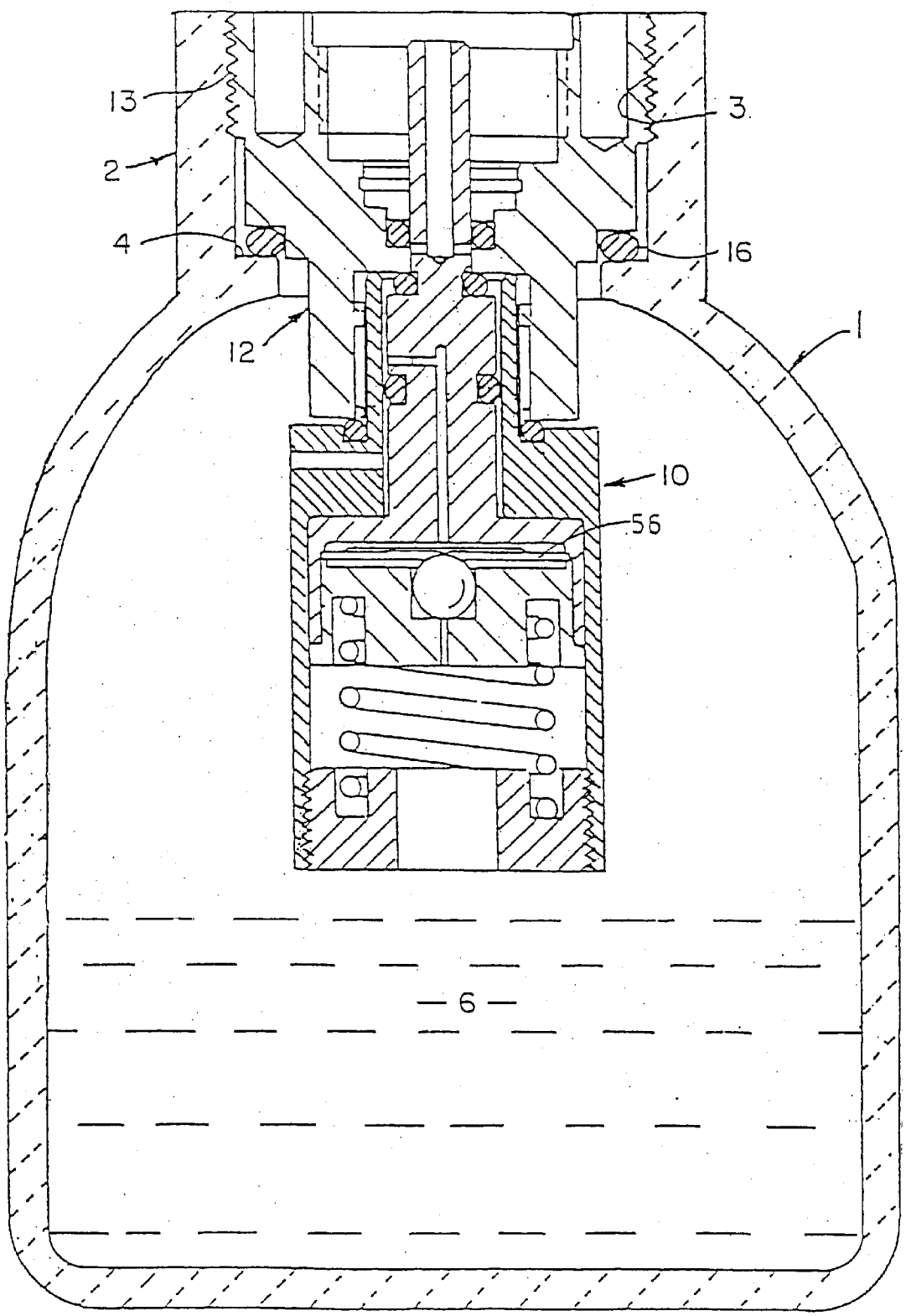
FIG. 1 is a diametric sectional view of a bottle and valve of this invention.
Figure 4:
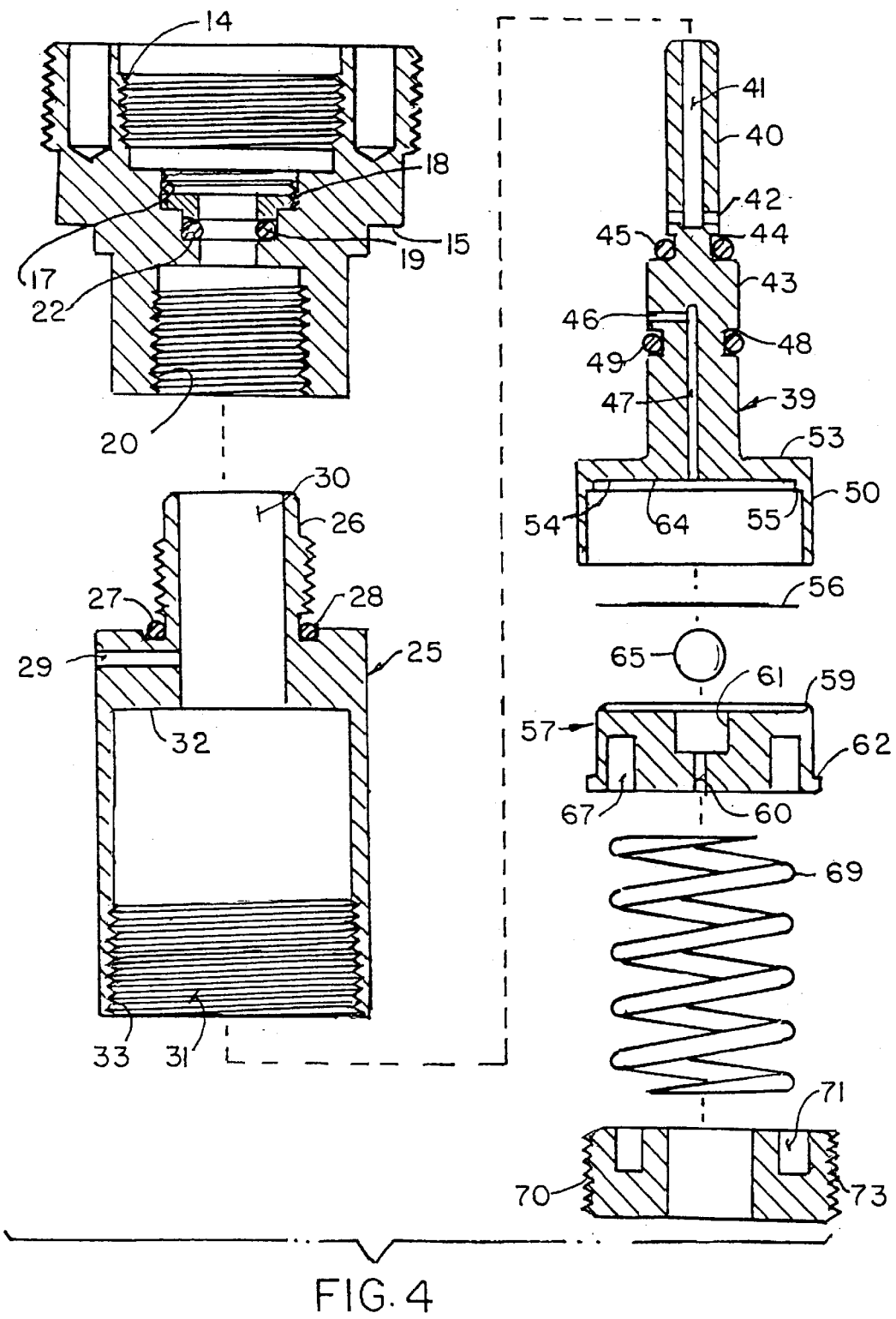
FIG. 4 is an exploded view of the valve, showing its constituent elements.

Referring to the drawings for one illustrative embodiment of bottle and valve of this invention, reference numeral 1 indicates the bottle, which has a neck 2 with internal threads 3 and a shoulder 4. In this embodiment, the bottle contains a mixture 6 of nitrogen and (0.08% or 0.10%) ethyl alcohol.

A valve 10 of this invention has a bonnet 12 with external threads 13 complementary to the threads 3 of the neck, and internal threads 14 to receive a fitting from a fill tank or a fitting of a regulator, control valve or the like into which gas is to be discharged from the bottle. A step 15 forms a seat for an O ring 16, which, seated on the shoulder 4 forms a seal, as shown particularly in FIG. 1. A stepped internally threaded passage 17 in the bonnet receives an externally threaded annular plug 18 with an axial passage, which cages an O ring 19 resting on an upper surface of an internal shoulder 22. A lower passage 20, internally threaded, receives an externally threaded cylindrical neck 26 of a valve body 25. A channel at the lower end of the neck 26 forms a seat 27 for an O ring 28, which abuts a lower edge of the skirt defining the passage 20.

A radially extending fill passage 29 communicates with the exterior of the body 25 at one end and with an axial passage 30 in the body at its other end. An expanded cylindrical chamber 31 extends from the lower end of the passage 30 to an open end of the valve body 25. The chamber 31 is defined at its upper end in part by a radial surface 32 which serves as a stop, as will be explained hereinafter.

The actuating element of the valve includes a stem 40 with an axial passage 41 through it, diametrically extending lateral passages 42 that communicate with the exterior of the stem and with the passage 41, an intermediate part 43 of larger diameter than the stem 40, with a seat channel 44 between the intermediate part and the stem to house an O ring 45, and a thermal valve chamber 50, of larger diameter than the intermediate part. A radial discharge passage 46 communicates with the exterior of the part 43 and with an axial passage 41, the lower end of which opens into the thermal valve chamber 50. An annular channel 48 in the intermediate part 43 houses an O ring 49 below the radial discharge passage 46, forming a seal against the inner wall of the passage 30. The thermal valve chamber 50 has an outer radial surface 53, which abuts the inner surface 32 of the chamber 31, and an inner radial surface 54 bounded by an annular shoulder 55, a lower surface of which serves as a seat for a bimetal disc 56, which is caged between the shoulder 55 and a rim 59 of an orifice plate 57. The orifice plate 57 has a well 61, within which a ball 65 is moveably seated, an orifice passage 60 communicating at its upper end with the well 61 and at its lower end with the exterior of the orifice plate, and a spring receiving channel 67. A radially outwardly extending flange 62 around the lower edge of the orifice plate, abutting the skirt of the valve chamber 50, limits the upward movement of the orifice plate.

A spring retainer disc 70 has external threads 73 complementary to the threads 33 of the cylindrical chamber 31, an axial passage 66, and an annular spring receiving channel 71. A helical compression spring 69 is caged between the channel 67 of the orifice plate 57 and the channel 71 of the spring retainer disc 70.

In filling the bottle, the stem 40 is moved to its lowest position against the bias of the spring 69, at which point the radial passage 46 is below the fill passage 29, so that gas introduced to the neck passage 41 flows through the passages 42, around the intermediate part 43 and out the fill passage 29. When the bottle is filled, the stem 40 is permitted to be moved to the position shown in FIG. 1 by the bias of the spring, at which position, the O ring 49 and the O ring 45, which abuts the underside of the internal shoulder 22 of the bonnet well, seal the bottle against escape of gas.

In discharging the contents of the bottle at a temperature within the desired range, the stem 40 is depressed only half way, so that the fill passage 29 is isolated by the O ring 49, as shown in FIG. 2, the gaseous mixture 6 passes through the passage 66, through the orifice 60, past the ball 65 and disc 56, through the passages 47 and 46 of the intermediate part and through the passages 42 and 41, hence out of the bottle. However, when the temperature on the inside of the bottle reaches a point at which the bimetal disc 50 acts, the disc snaps to a position in which the ball 65 is forced against the orifice 60, stopping the flow of gas as shown in FIG. 3. In the illustrative example, the initial pressure of gas in the bottle is about 1100 lbs. per square inch, but the orifice 60 is on the order of about ten one-thousandths of an inch (0.01") in diameter, so the sealing force required of the disc is well within the capacity of commercially available bimetal discs. In the embodiment shown, the disc snaps over at about 35° F. Clearly, if one is concerned with a high temperature rather than a low one, a disc with the property of snapping over at a higher temperature can be used. If it is desired to limit the flow at both a low temperature and a high temperature, it is only necessary to provide two discs in series, because the discs have the virtue of returning to "unsnapped" position when the temperature has risen (or fallen, as the case may be) beyond the critical temperature. It is to be noted that the operation of the valve is independent of the pressure of the gas in the bottle.

Merely by way of illustration and not of limitation, the stem passage 41 can be 1/16" in diameter, and the lateral passages, 0.031", the fill passage 29 can be about 0.043" in diameter, and the passage defined between the intermediate part 43 and the surrounding wall of the valve body, about 0.015" wide. Because the intermediate part 43 is, in this illustration, about 0.275" in diameter, the total volume available around the stem is greater than the volume of the fill passage 29. Although during the filling process, the radial discharge passage 46 is open to the space between the passage between the intermediate part 43 and the valve body, so that gas can flow between the space and the port 60, little, if any gas will be introduced to the bottle through the port 60, because of the availability of the fill passage 29. As has been indicated, the fill tank gas mixture is at about 1,100 pounds per square inch, so that initially the drop in pressure over the fill port is enough to cause expansion of the gas mixture, hence some cooling of the mixture, but a great deal less than would the drop over the discharge port 60. As is apparent, the provision of the larger fill port speeds the filling process. If, for some reason, it is desired to empty the bottle quickly, the valve stem can be depressed all the way, as in the filling mode, and the gas mixture allowed to escape.

Numerous variations in the construction of the valve of this invention will occur to those skilled in the art in light of the foregoing disclosure. The dimensions given in the example are, as indicated, merely illustrative. They can be varied over a wide range, depending upon the application of the device, the fill rate desired, and the kind of gas or gas mixture involved. As to other variations, merely by way of example, a bimetal strip can be used in lieu of the disc, the additional time required for the closing being undesirable but not an insuperable obstacle, as long as the valve is fully closed at the critical temperature. The particular configuration of the valve, and its various elements, can be varied, as long as the thermally responsive element is carried by the stem assembly. The thermally responsive element can actuate a sleeve type valve mechanism. The particular construction of the bottle itself forms no part of the invention and can be varied in any desired way, the valve being configured accordingly These variations are merely illustrative.

Having thus described the invention, what is claimed and desired to be secured by Letters Patent is:

1. A bottle charged with a gaseous material intended to be discharged through a range of temperatures but not outside that range, and a valve through which said gaseous material is to be directed, said valve having at least a part wholly inside said bottle, said part having a restricted port through it through which said gaseous material passes to issue from said valve, and a thermally responsive member adapted to block said port when the temperature of the interior of said bottle is outside said range, said thermally responsive member comprising a bimetal snap disc.

2. The bottle of claim 1 wherein said thermally responsive member includes a ball that seats to block said port.

3. The bottle of claim 2 wherein said port is on the order of 0.01" in diameter.

4. A bottle charged with a gaseous mixture a component of which condenses at a temperature to which said bottle is liable to be cooled in use, and a valve through which said gaseous mixture is to be directed, said valve having at least a part wholly inside said bottle, said part having a restricted port through which said gaseous mixture passes to issue from said valve, and a thermally responsive member adapted to block said port when the temperature in the interior of said bottle is below a predetermined temperature sufficiently above said temperature of condensation as to ensure that condensation of said component has not occurred, and to open said port when the interior temperature is above said predetermined temperature wherein the gaseous mixture comprises a carrier gas and a liquid, and said liquid is ethanol.

5. The bottle of claim 4 wherein the temperature at which the thermally responsive member acts to close the port is about 35 degrees F.

6. The bottle of claim 4 wherein the carrier gas is nitrogen.

7. A valve having at least a part to be mounted wholly within a bottle containing a gaseous material selectively introduced to and discharged from the bottle through the valve, said valve having a body with a cylindrical inner wall with a radial filling passage, and a stem mounted for axial sliding movement in said body and having an end projecting from said bottle, said stem having an axial passage opening outwardly from said bottle, an intermediate part having an axial passage separated from said stem axial passage, and a radial passage through said intermediate part and communicating with said intermediate part axial passage and with a space between said intermediate part and the cylindrical inner wall of said body, said intermediate part radial passage being of lesser diameter than said radial filling passage, a thermal valve chamber connected to an axially inboard end of said stem, said thermal valve chamber having a restricted port through it, communicating with said intermediate part axial passage, through which said gaseous material passes to issue from said valve, a thermally responsive member, at least a part of which is located within said thermal valve chamber, adapted to block said port when the temperature of the interior of said bottle is outside a preselected range, and means for biasing said stem in a direction outboard of said bottle, said stem being moveable against the bias of said biasing means to a position at which the intermediate part radial passage is above the radial filling passage, at which position said radial filling passage is blocked from communication with the stem neck axial passage, and a position at which the intermediate part radial passage is below the radial filling passage, at which position said radial filling passage communicates with the stem neck axial passage.

8. The valve of claim 7 wherein the thermally responsive member is carried by an axially moving actuating element.

9. A bottle charged with a gaseous mixture a component of which condenses at a temperature to which said bottle is liable to be cooled in use, and a valve through which said gaseous mixture is to be directed, said valve having at least a part wholly inside said bottle, said part having a restricted port through which said gaseous mixture passes to issue from said valve, and a thermally responsive member adapted to block said port when the interior of said bottle is below a predetermined temperature sufficiently above said temperature of condensation as to ensure that condensation of said component has not occurred, and to open said port when the interior temperature is above said predetermined temperature.

10. A bottle charged with a gaseous material intended to be discharged through a range of temperatures but not outside that range, and a valve through which said gaseous material is to be directed, said valve having at least a part wholly inside said bottle, said part having a restricted port through it through which said gaseous material passes to issue from said valve, and a thermally responsive member responsive to the temperature inside said bottle, adapted to black said port when the temperature of the interior of said bottle is outside said range, wherein said gaseous material is discharged through a stem passage in said valve and said bottle is filled with said gaseous material through said stem passage, said valve has a fill port communicating with said stem passage, said fill port being of a diameter greater than said restricted port and means for effectively bypassing said restricted port to introduce said gaseous material through said fill port.

* * * * *

UNITED STATES PATENT AND TRADEMARK OFFICE
CERTIFICATE OF CORRECTION

PATENT NO. : 6,557,592 B2  Page 1 of 1
DATED : May 6, 2003
INVENTOR(S) : Steven J. Nagel It is certified that error appears in the above-identified patent and that said Letters Patent is hereby corrected as shown below:

Column 6,
Line 13, replace "black" with -- block --

Signed and Sealed this

Twenty-second Day of July, 2003

JAMES E. ROGAN
*Director of the United States Patent and Trademark Office*